Feb. 16, 1971  R. V. COOK  3,564,500
SYSTEM AND APPARATUS FOR VALIDATING AND VERIFYING
OWNERSHIP OF CREDIT CARDS AND THE LIKE
Filed June 23, 1969  2 Sheets-Sheet 1

INVENTOR
RALPH V. COOK

BY John Gibson Semmes
ATTORNEY

Feb. 16, 1971  R. V. COOK  3,564,500
SYSTEM AND APPARATUS FOR VALIDATING AND VERIFYING
OWNERSHIP OF CREDIT CARDS AND THE LIKE
Filed June 23, 1969  2 Sheets-Sheet 2
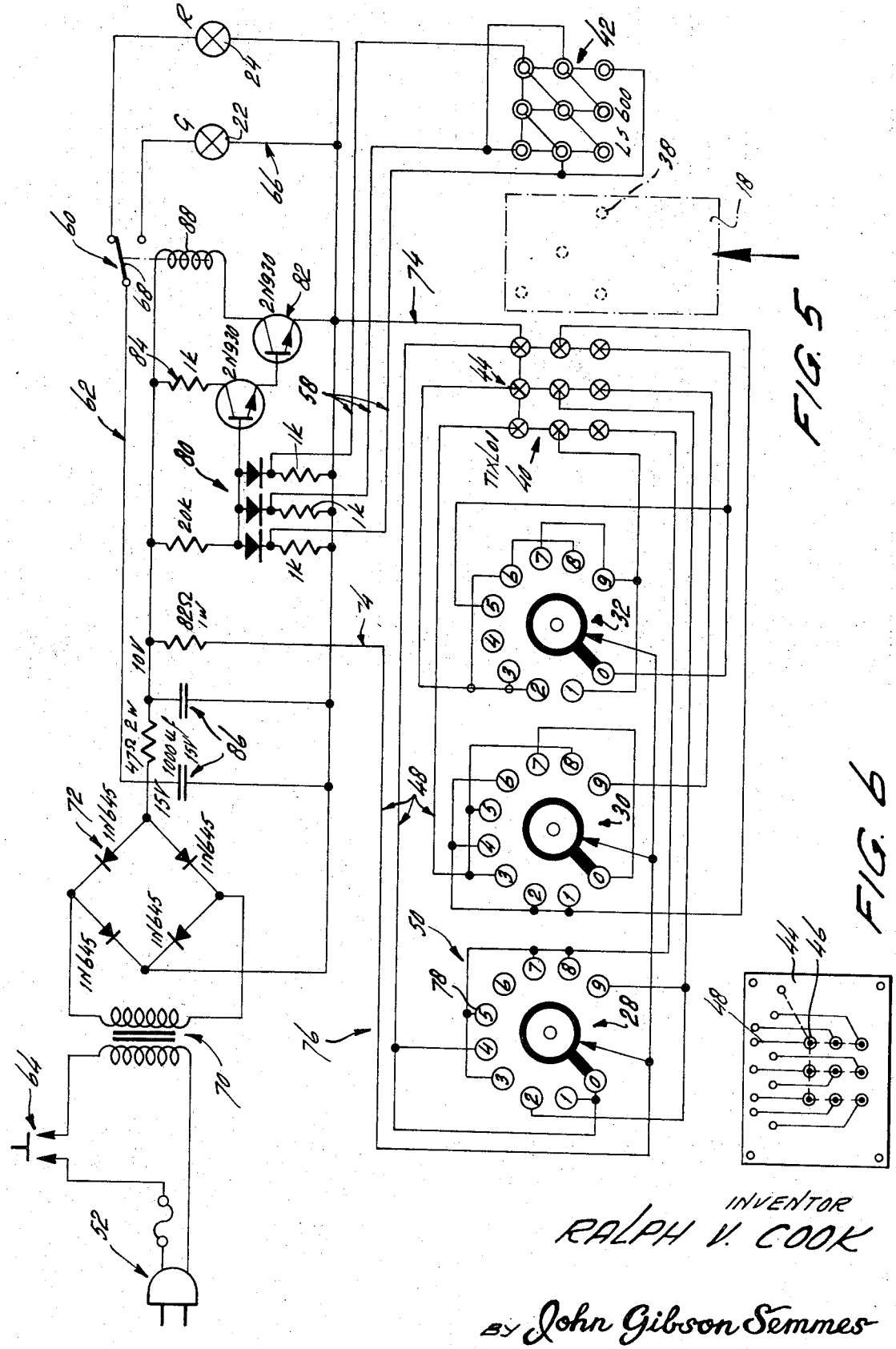
INVENTOR
RALPH V. COOK
BY John Gibson Semmes
ATTORNEY United States Patent Office 3,564,500
Patented Feb. 16, 1971

3,564,500
SYSTEM AND APPARATUS FOR VALIDATING AND VERIFYING OWNERSHIP OF CREDIT CARDS AND THE LIKE
Ralph V. Cook, 416 NW. 19th,
Oklahoma City, Okla. 73103
Filed June 23, 1969, Ser. No. 835,626
Int. Cl. H04q 3/02
U.S. Cl. 340—149                                5 Claims

ABSTRACT OF THE DISCLOSURE

A system and apparatus for validating, verifying credit card and the like ownership, also usable for and in conjunction with, for example, determination of credit status of the owner, utilizing a known form of credit card having the usual visual identifying and recording means thereon. The card further includes a plurality of apertures therethrough arranged in coded positions to cooperate with selective plural light sources, the system being operable to activate only preselected ones of the light sources, as selected by a card owner or a clerk registering and recording a sale in accordance with a code number known only to the owner. Means are provided for receiving emitted light from the so activated light source passing through the coded apertures and operable when the user activated light sources correspond with the coded card apertures to activate, through light sensors, one or more interconnected electrical circuits to indicate visually validity or correct ownership of the card. Noncorrespondence of the preselected light source operation, coded apertures, and sensors, together with the circuits, serve to indicate nonverification of card. The system in conjunction with appropriate circuitry and additional apparatus also permits ascertaining credit standing or the like of a card bearer, or can serve to activate equipment extraneous to the system.

BACKGROUND OF THE INVENTION

Field of the invention

This invention relates to validation or holder identification of credit cards and the like, utilizing coded light emission and reception to activate indication circuits, wherein a card user or clerk must manually select a coded pattern for the light emission as known only by the card holder.

Description of the prior art

Heretofore considerable time, effort and expense have been devoted to development of systems and apparatus for validating credit cards and establishing ownership of the cards in a card bearer or user. Such systems and apparatus, however, have, in many instances, been complex and expensive, and additionally, complexity enhances the possibility of breakdowns. In many known systems, simplicity of use and operation have been lacking and in many instances, extraneous or additional means are required over and above the credit card and the like to perform the desired function. These factors lead to resultant drawbacks in acceptance and end results obtained.

Some hitherto known identification or validation card or the like systems have incorporated mechanically actuated mechanisms, magnetic circuits and switches and the like, in order to establish desired circuits to provide visual indication as to validity or identification. Some such systems, however, permitted ready detection of and duplication of card circuits or systems. Additionally, changing of the code and circuits required complex apparatus and resulting high time and cost factors. Furthermore, the number of different codes which could be established in known credit cards systems was limited.

All of the foregoing drawbacks, among others, detracted from widespread acceptance and use of the known validation and/or identification systems.

SUMMARY OF THE INVENTION

It is accordingly a principal feature of the present invention to provide apparatus and system for validating and insuring user identification of credit cards and the like which overcomes drawbacks in previously known systems. This system is simple and inexpensive to manufacture, with inherent simplicity in use. The invention utilizes a coded light emssion source to establish a plurality of emitted individual light rays dependent upon a card user establishing a code pattern. The light rays coact with and pass through coded apertures in a card for transmission to selected ones of a plurality of light sensors, which in an established circuitry system operate to indicate correct correspondence of the coded light emission selection and apertures in the card, and thereby established validation and user identity of the card. The system could also be incorporated in a system including further checking or functional operations in conjunction with use of a credit and the like.

The credit card and the like contemplated by the invention is opaque and prevents passage therethrough of light rays other than through the coded apertures to minimize fraudulent credit card use or inadvertently inaccurate operation of the system.

Validity of, or identification of, ownership is possible only through use of a secret code known only to a proper card owner, and in the absence of any additional or outside elements, and affords visual signal means as to true or untrue ownership through circuits which can only be completed when a light source is properly established and accepted by a light sensor circuit, with utilization of a plurality of light passage apertures in a card, the card otherwise precluding passage of light therethrough. A change in code circuitry can be easily and readily effected for a vast multiplicity of codes, through an easily and quickly effected change in light emission and sensing circuitry to correspond with aperture coded cards, likewise easily manufactured. The construction and operation are not only subject to quick changes, but additional misleading apertures can be incorporated to further confuse possible unauthorized holder usages of a card.

The foregoing and other objects and advantages will become apparent and the invention will be better understood from the following detailed description of embodiments thereof illustrated in the accompanying drawings. Various changes may be made in details of construction and arrangement of parts, and certain features may be used without others, all such modifications within the scope of the appended claims are included in the invention.

BRIEF DESCRIPTION OF THE DRAWINGS

FIG. 5 is an illustrative circuit diagram in connection with operation of the invention; and FIG. 6 is a plan view of a replaceable block of a type for activating individual selected light sources.

Figure 1:
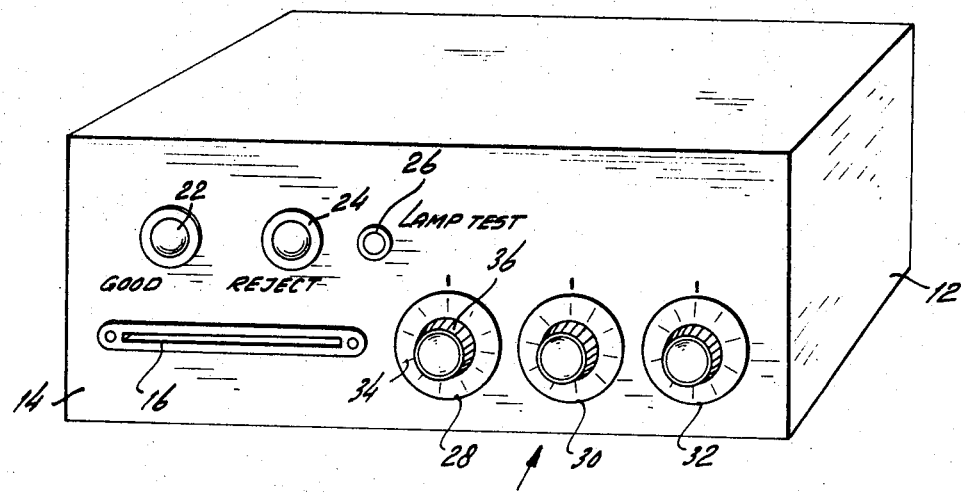
FIG. 1 is a perspective view of a validator and identification apparatus in accordance with the present invention.
Figure 2:
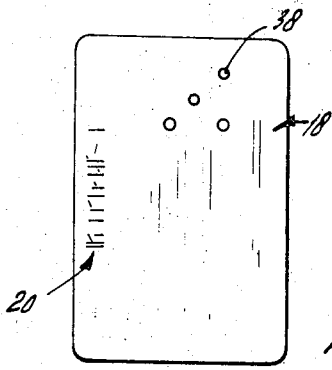
FIG. 2 is a plan view of a credit card and the like as contemplated for use with the invention disclosing encoded apertures therein.

Referring now in more detail to the drawings, the credit card checking system generally designated 10, includes a housing 12 which has on an operator face 14 a slot 16 to receive a credit card to be checked. Known types of credit cards, generally indicated at 18, preferably consisting of a plastic material which is opaque for reasons hereinafter set forth, has the usual visual indicia 20 incorporated thereon in raised or stamped form or the like. Indicator lamps 22 and 24 are secured in face 14. The lamp 22 is, for example, green to indicate credit card acceptance, and lamp 24 is red to indicate credit card rejection, both in circuitry to be hereinafter described. A lamp test 26 is positioned adjacent the indicator lamps. A plurality, in the illustrated embodiment, consisting of three, switch dials 28, 30 and 32 are mounted, and switch position indicators 34 are incorporated and which can be placed either on the face, per se, or on a rotatable dial to coact with a pointer on the face. The switches as shown are preferably of a rotary type actuable by knobs 36 but other switch types or constructions can be utilized within the teachings of the invention. The purpose of the buttons and dials is to rotate or set the individual switches in the circuitry to establish a code consisting of a plurality of numerals or letters known only to a card holder, and this code is incorporated in the credit card per se as also in the tester circuitry in such a manner that upon insertion of a credit card and a proper setting of the switches, a validation or ownership certification will be indicated by the green lamp 22, whereas if the proper code is not set on the switches by a person without knowledge of the code, a reject red light would appear on lamp 24, and a sale or service could therefore be refused to the card holder since obviously questionable ownership would immediately be apparent to a vendor. This personal knowledge of the code by a proper card holder and user is a paramount interest in the invention, and to all persons concerned in use of a card including the card owner, the retail vendor, and the vending company, such as in retail gasoline sales and the like.

Figure 3:
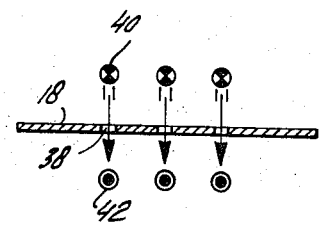
FIG. 3 is a schematic illustration of functional operation of the present system, and modus operandi thereof.

The concept of the invention broadly is to permit a vendor or creditor, as for example, an oil company, to instantly check or get a read-out for validation of a customer's credit card to determine whether or not it belongs to the customer, or may have been stolen, or to, for example, check a user's credit standing. The customer is solely in possession of knowledge as to what his secret code number is. In the illustrated embodiment a three digit code and system are shown and described, and the conventional credit card 18 has been encoded by the major vendor by punching a plurality of apertures 38 therethrough in a predetermined code pattern and these apertures will, in use, read out the code number to a printed circuit containing, in the instance of a three digit system, nine contacts in a predetermined manner. The credit card with the encoded apertures is simply a means of blocking out nonessential circuits in a card checker or computer circuit wherein, as the card is inserted, it is located between a plurality, in the illustrated embodiment, nine light sources and nine light sensors. When the switches have been set in accordance with the card owner's code, either by the attendant or the owner, the circuit is set to energize certain ones of the light sources in accordance with the code pattern. If the coded apertures in the card permit the correct coded light sources to pass therethrough to the light sensors, a green signal is applied, and if not, a red or reject signal is shown on the outside of the housing as above explained, whereby upon instantaneous reading by the attendant a card is verified or rejected. The required card setting being known only to a proper card owner ensures that unauthorized use of a card is prevented. The modus operandi of the invention will be understood by reference to FIG. 3 wherein is shown a plurality of light sources 40 which are activated upon proper setting of the switches, and when properly actuated in accordance with the code, light rays will pass through apertures 38 correspondingly encoded on card 18 to impinge upon certain proper required ones of light sensors 42 incorporated in appropriate circuitry to actuate the green light. The red or reject light is actuated if the proper code is not established on the switches since light from the light sources cannot pass through the opaque card except through the apertures.

Figure 4:
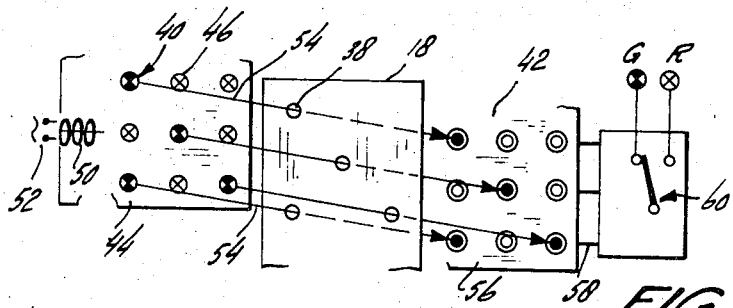
FIG. 4 is a schematic block diagram depicting components and circuitry used in accordance with the invention, the card ownership being valid.
Figure 4A:
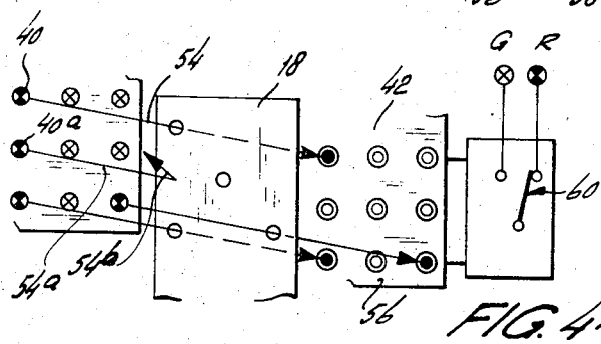
FIG. 4A is a view similar to FIG. 4, card ownership being questionable.

The overall broad concept of the invention can be understood by and from FIGS. 4 and 4A. A plurality of light sources 40 are preferably mounted on a block 44 of plastic or other material and includes, in a three digit system, nine contacts 46 connected into a printed circuit which establishes the light sources in a coded pattern by means of leads 48, FIG. 6, appropriately connected by circuitry to switches 50, adapted for establishing activation of the individual light sources in accordance with a code through setting of the switches. A power supply source to the system is generally indicated at 52 and can consist of an AC or DC source of appropriate voltage and characteristics in a manner well known. Light rays schematically indicated at 54 emanate from the activated light sources. They are directed to a plurality of light sensors 42, again connected in a printed circuit on, for example, a block board 56 similar to block 44 in a prearranged coded manner in a proper circuit to function, hereinafter described. The coded card 18 is interposed between the light sources and sensors so that only the rays 54 corresponding to the proper code will pass through the apertures and impinge upon proper ones of the sensors 42, the opaque material of the card rejecting all other rays. The sensors 42 upon receiving rays emanating in accordance with the code, will pass current through leads 58 to switch means generally designated 60. The circuit for the system shown and described includes appropriate means normally biasing the switch 60 to a closed position in the red or reject lamp circuit 62, which, in the absence of proper code setting of the light selector switches will, upon closing of test switch 64, activate the red reject light. The circuit also includes means such that when all of the leads 58 are energized a transistor, switching and relay circuit will be activated in a green or accept circuit, generally 66, by throwing switch arm 68 into contact with the green light contact through a go-around circuit established. Therefore, if the proper code is established on the switches and is in accordance with the apertures in the credit card, the proper light sources will be energized and will then activate and energize the proper sensors in the proper established pattern to visually indicate validity or acceptance of the card. The code can be readily and quickly changed by insertion of new blocks containing the predesigned and arranged light source and sensor circuits together with a properly apertured credit card. These various elements are of such a construction and type that they are substantially tamper proof, and the established circuitry or code pattern cannot readily be determined in the absence of extensive trial and error manipulation or inspection. This renders the present system economically and time-wise unfeasible of precalculated attempts to determine the code for fraudulent or unauthorized use of a credit card.

Referring now to FIG. 5, a circuit usable with the invention is shown in substantial detail. Manifestly, changes in individual components and circuitry can be effected by those skilled in the art. In the illustrated embodiment the power source can consist of 115 volts, AC, single phase source, but can be different with proper components. The power input passes through an appropriate transformer 70 into a sensor, read-out circuit generally designated 72 and through leads 74 to a light source circuit generally indicated at 76. The switches 50 have a plurality of contacts 78, in a usual manner, connected by the contact leads 48 to individual ones of contacts 46 of light sources 44 in a predetermined pattern as hereinbefore stated. Setting of the switches will therefore actuate given ones of the light sources in accordance with the switch setting, and commensurate with the set code pattern of the light sources in appropriate preestablished circuitry.

The light sensors 42, arranged in a predetermined and set circuit through leads 58 are connected to a bank of transistors 80, one with each lead 58, and upon energization of each of the transistors then through appropriate switching elements 82, with incorporation of appropriate resistors 84, and condensers 86, will energize relay 88 to establish a go-around circuit to move switch arm 68 into closed position with respect to the green lamp circuit, and at the same time open the red or reject lamp circuit. Appropriate components and values are indicated by way of example only on the circuit schematic and are operable therein in an appropriate and obvious manner. Further description herein is not considered necessary for practice of the invention by those skilled in the art.

The relationship and functioning of the combination of light sources, credit card with apertures and light sensors are shown in FIGS. 4 and 4A, wherein it will be seen that proper rays from the individual light sources 40 will pass through encoded apertures 38 and impinge upon certain ones of the sensors 42. If the coded patterns all mate actuation of the green or accept light will result. FIG. 4A shows a condition wherein the light sources, apertures and sensors are not properly mated or matched. Here an improperly or incorrectly activated light source is indicated at 40A, with the light ray 54A being reflected from the opaque card 18, no aperture therefor being provided, with the reflected ray portion being shown at 54B. Appropriately energized or instituted rays 54 are otherwise shown as passing through appropriate apertures.

It will therefore be seen that the present invention will operate to indicate or signal a true ownership of a card by use of a secret code known only to the proper owner of the card, and unauthorized use or tampering with the card and system is eliminated. The arrangement and circuitry can be readily and easily changed by replacement of mating and matching components as aforesaid, and the present system can be utilized in many different manners. A greater or lesser number of light sources and sensors with actuating mechanism therefor can be utilized, and the number of codes that can be established is, as can be readily understood, extremely great.

While a test contact switch for manual operation has been described, obviously a card actuated switch could be used, and appropriate means could be incorporated for accurate positioning of the card in the system. The system is susceptible of being transistorized for compactness and low power consumption. The system is complete within itself and does not require a secondary piece for completion of a circuit for operation, and the circuits can be easily changed without unauthorized persons' knowledge and still identify a secret code known only by an owner. As indicated additional light sources and sensors can be placed in the system for an increased spread of code numbers, and if desired, the light sources and sensors can be made movable or rotated to give an increased variety of selection of secret code numbers.

Operation of the invention will be readily apparent from the foregoing description. Manifestly, minor changes in details can be effected within the disclosed and described system without departing from the scope and spirit of the invention as defined in and limited solely by the appended claims.

I claim:

1. An encoded identity card or the like electrical check system having a circuit with means for deriving light therefrom, and sensor and readout means, comprising:
   (A) a plural light source, consisting of a plurality of individual lights, connected in a coded printed circuit;
   (B) means for activating selected ones of said lights to define an encoded pattern thereof;
   (C) a plurality of light sensors spaced from said lights in a patterned encoded array and in projected alignment therewith;
   (D) a card defining a plurality of light passage apertures therethrough in a predetermined pattern, interposable between said lights and said light sensors;
   (E) card code verification and rejection means operatively associated with and in circuit with said light sensors, correct light source pattern activation in a corresponding mating pattern with said card apertures, permitting impingement of light rays onto selected ones of said sensors in the pattern to activate the card verification means, mismatching of the light pattern and card apertures activating said card code rejection means.

2. A system as claimed in claim 1, the code comprising at least three-digit system, the lights consisting of at least three, and each having a contact connected into said printed circuit, said lights, said contacts and said circuit being incorporated in a removable and replaceable block, said lights and said light activating means being so interconnected in said circuit as to create a preselected light pattern upon selective activation of the derivation means in accordance with a card holder's code.

3. A system as claimed in claim 2, said card being opaque to thereby reject rays from said lights which are activated in nonaccordance with a card holder's code and thereby permitting activation of only the light sensors corresponding to the predetermined code.

4. A system as claimed in claim 3, said read-out means including separate visual validating and invalidating indicators, switch means for the validating and invalidating indicators, said invalidating indicator switch means being normally closed upon energization of said system, the light sensor circiut so interconnecting said light sensors in a predetermined pattern and being so interconnected with the indicator circuits that upon energization of the system with proper light setting mating with the coded apertures in said card, the normally closed invalidating indicator switch is opened and the validating indicator switch is closed for visually indicating card holder validation.

5. A system as claimed in claim 4, the light sensor circuit including nine sensors connected in predetermined circuit paths, leads from said paths, transistors connected to each said lead, switch means actuable by said transistors upon energization thereof and a relay in said readout circuit energizable by said switch means to activate said validation indicator switch upon light and card aperture mating determined by selected activation of said lights.

References Cited

UNITED STATES PATENTS

| | | | |
|---|---|---|---|
| 2,689,279 | 9/1954 | Noregaard. | |
| 2,714,201 | 7/1955 | Whitehead. | |
| 2,914,746 | 11/1959 | James. | |
| 2,976,916 | 1/1961 | Williams. | |
| 3,015,087 | 12/1961 | O'Gorman. | |
| 3,059,070 | 10/1962 | Noregaard. | |
| 3,097,347 | 7/1963 | Simjian. | |
| 3,154,761 | 10/1964 | O'Gorman. | |
| 3,315,230 | 4/1967 | Weingart | |
| 3,387,265 | 6/1968 | Smeiman. | |
| 3,394,246 | 7/1968 | Goldman. | |
| 3,403,380 | 9/1968 | Welch | 317—134X |
| 3,430,200 | 2/1969 | Barney. | |
| 3,457,391 | 7/1969 | Yamamoto | 340—149X |

DONALD J. YUSKO, Primary Examiner

U.S. Cl. X.R.

317—134